United States Patent
Yeh

(10) Patent No.: US 10,892,454 B2
(45) Date of Patent: Jan. 12, 2021

(54) BATTERY MODULE WITH THERMAL DISSIPATION AND THERMAL RUNAWAY PREVENTION

(71) Applicant: INDUSTRIAL TECHNOLOGY RESEARCH INSTITUTE, Hsinchu (TW)

(72) Inventor: Sheng-Fa Yeh, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 296 days.

(21) Appl. No.: 16/181,462

(22) Filed: Nov. 6, 2018

(65) Prior Publication Data
US 2019/0140233 A1 May 9, 2019

(30) Foreign Application Priority Data
Nov. 7, 2017 (TW) .............................. 106216518 U

(51) Int. Cl.
*H01M 2/10* (2006.01)
*H01M 2/02* (2006.01)
(Continued)

(52) U.S. Cl.
CPC ......... *H01M 2/1094* (2013.01); *H01M 2/029* (2013.01); *H01M 2/1016* (2013.01);
(Continued)

(58) Field of Classification Search
CPC ... H01M 2/029; H01M 2/1094; H01M 10/658
(Continued)

(56) References Cited

U.S. PATENT DOCUMENTS 8,785,026 B2 7/2014 Hu et al.
9,240,575 B2 1/2016 Kanata et al.
(Continued)

FOREIGN PATENT DOCUMENTS

CN 202557965 11/2012
CN 203150640 8/2013
(Continued)

OTHER PUBLICATIONS

Taiwanese Invalidation for Taiwanese Patent Application No. 106216518 dated Jul. 4, 2019.
(Continued)

*Primary Examiner* — James M Erwin
(74) *Attorney, Agent, or Firm* — Amin, Turocy & Watson, LLP

(57) ABSTRACT

A battery module with thermal dissipation and thermal runaway prevention is provided, including at least one battery and a fireproof thermal insulation layer. The at least one battery may include a plurality of battery cells electrically connected through conductors. The fireproof thermal insulation layer includes a plurality of battery holes for disposing the battery cells therein and a plurality of air holes vertically penetrating the fireproof thermal insulation layer. A side of each of the battery cells is sleeved in the fireproof thermal insulation layer, and the plurality of air holes are provided between adjacent ones of the plurality of battery holes. The fireproof thermal insulation layer has a heat transfer coefficient that decreases with an increase in the temperature of the fireproof thermal insulation layer.

16 Claims, 7 Drawing Sheets

(51) Int. Cl.
*H01M 10/658* (2014.01)
*H01M 10/643* (2014.01)

(52) U.S. Cl.
CPC ........ *H01M 2/1077* (2013.01); *H01M 10/643* (2015.04); *H01M 10/658* (2015.04); *H01M 2200/00* (2013.01)

(58) Field of Classification Search
USPC ........................................................ 429/120
See application file for complete search history.

(56) References Cited

U.S. PATENT DOCUMENTS

| | | |
|---|---|---|
| 2015/0086829 A1 | 3/2015 | Sun et al. |
| 2015/0118543 A1 | 4/2015 | Kim et al. |
| 2016/0233465 A1* | 8/2016 | Lee ..................... H01M 10/625 |

FOREIGN PATENT DOCUMENTS

| | | |
|---|---|---|
| CN | 103579697 | 2/2014 |
| CN | 203800094 | 8/2014 |
| CN | 104096331 | 10/2014 |
| CN | 104466053 | 3/2015 |
| CN | 204287235 | 4/2015 |
| CN | 204375798 | 6/2015 |
| CN | 105244550 | 1/2016 |
| KR | 20070106815 | 11/2007 |
| KR | 20080066312 | 7/2008 |
| KR | 20150092572 | 8/2015 |
| TW | I345850 | 7/2011 |
| TW | I419391 | 12/2013 |
| TW | 201529722 | 8/2015 |
| TW | M556938 | 3/2018 |

OTHER PUBLICATIONS

Muller, et al. "Modeling Thermal Abuse in Transportation Batteries", Sandia Report Sand2012-7816 Unlimited Release Printed September; Jan. 1, 2012.

Han, "Transport and Kinetic Phenomena Linked to Poer Performance of Lithium-Ion Batteries", A dissertation submitted in partial fulfillment of the requirements for the degree of Doctor of Philosophy (Mechanical Engineering) in the University of Michigan; Jan. 1, 2014; 17-59.

Subramanian, et al. "Mathematical Model Reformulation for Lithium-Ion Battery Simulations: Galvanostatic Boundary Conditions", Journal of The Electrochemical Society; Jan. 1, 2009; 156 (4) A260-A271.

Zhu, et al. "Development of a theoretically based thermal model for lithium ion battery pack", Journal of Power Sources vol. 223, Feb. 1, 2013; Jan. 1, 2013; 155-164.

Gu, et al. "Thermal-Electrochemical Coupled Modeling of a Lithium-ion Cell", GATE Center for advanced Energy Storage, Department of Mechanical Engineering & Pennsylvania Transportation Institute, The Pennsylvania State University.

* cited by examiner

BATTERY MODULE WITH THERMAL DISSIPATION AND THERMAL RUNAWAY PREVENTION

CROSS REFERENCE TO RELATED APPLICATION

This application claims the priority of the Taiwan Patent Application No. 106216518 filed on Nov. 7, 2017, which is hereby incorporated by reference in its entirety.

FIELD OF THE DISCLOSURE

The present disclosure relates to battery modules, and, more particularly, to a battery module with thermal dissipation and thermal runaway prevention.

BACKGROUND OF THE DISCLOSURE

In battery module systems, the burnt down of an entire battery module due to thermal runaway is quite common. This is especially the case in high-energy lithium battery modules as the batteries are stacked tightly, the heat generated by even just one battery may cause an uncontrollable chain reaction, causing destructions of all the batteries in the module, in some cases even causing casualties with fatal explosion. In view of this, it is imperative to develop materials and methods for effectively controlling thermal energy to ensure the safety of the battery modules and preventing a complete destruction of the battery modules and the loss of lives and assets.

SUMMARY OF THE DISCLOSURE

In an embodiment, the present disclosure provides a battery module with thermal dissipation and thermal runaway prevention, which may include at least one battery and a fireproof thermal insulation layer. The at least one battery may include a plurality of battery cells electrically connected through conductors. The fireproof thermal insulation layer includes a plurality of battery holes for disposing the battery cells therein and a plurality of air holes vertically penetrating the fireproof thermal insulation layer. A side of each battery cell is sleeved in the fireproof thermal insulation layer, and the air holes are provided between adjacent ones of the plurality of battery holes. A heat transfer coefficient of the fireproof thermal insulation layer decreases as a temperature of the fireproof thermal insulation layer increases.

The above features and advantages of the present disclosure can be more fully understood by reading the following embodiments in conjunction with the attached drawings.

DETAILED DESCRIPTION OF THE EMBODIMENTS

Figure 1:
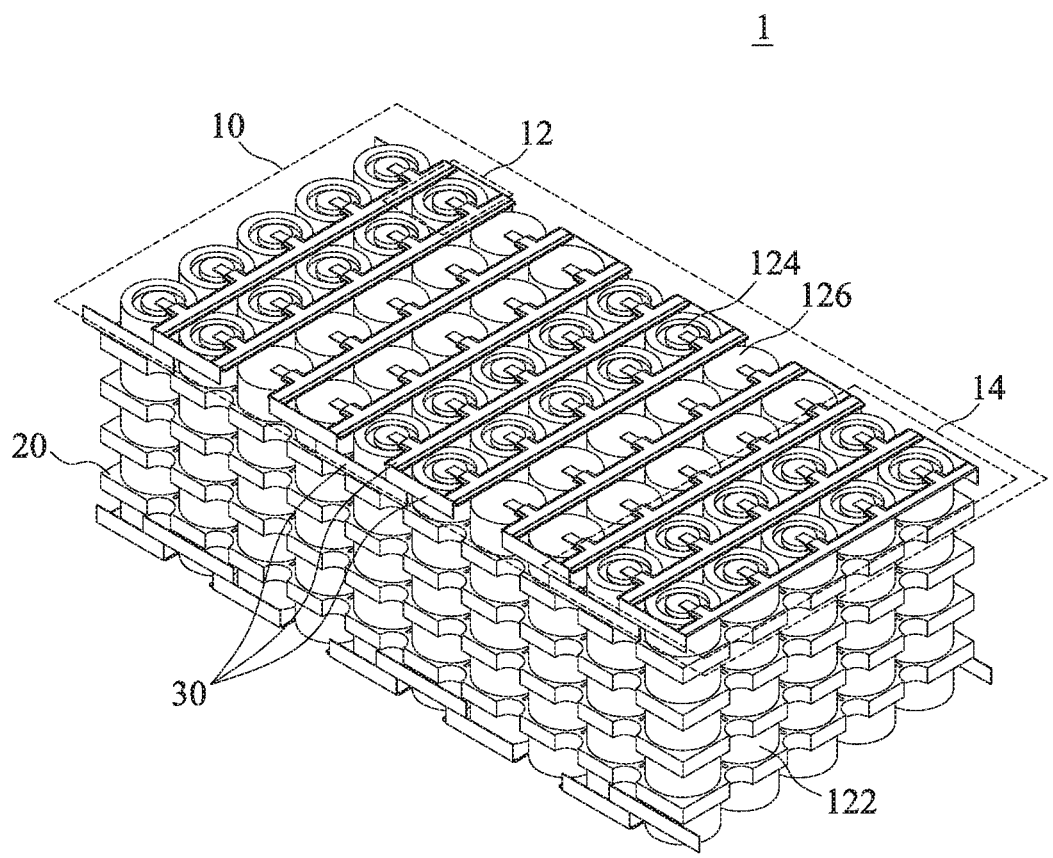
FIG. 1 is a schematic diagram depicting a battery module with thermal dissipation and thermal runaway prevention in accordance with an embodiment of the present disclosure.
Figure 2:
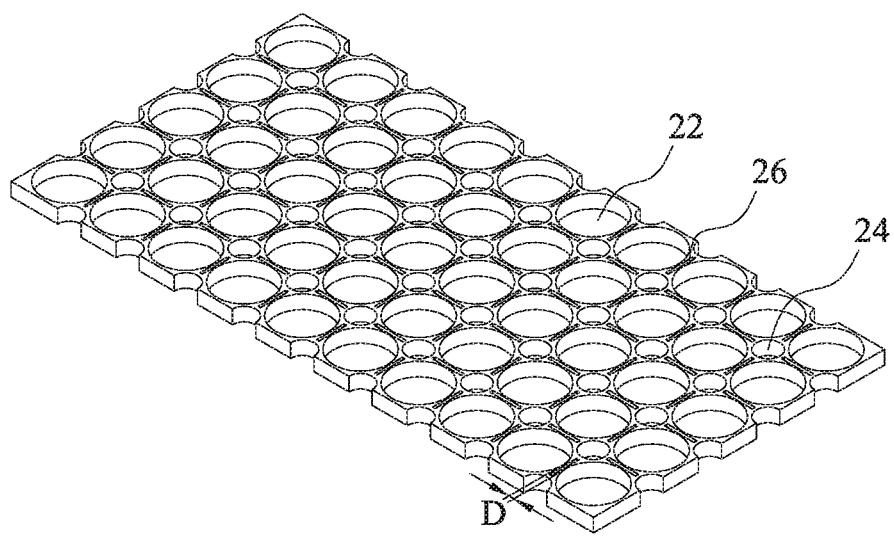
FIG. 2 is a schematic diagram depicting a fireproof thermal insulation layer in the battery module with thermal dissipation and thermal runaway prevention in accordance with the present disclosure.

FIG. 1 shows a schematic diagram depicting a battery module with thermal dissipation and thermal runaway prevention in accordance with an embodiment of the present disclosure. FIG. 2 shows a schematic diagram depicting a fireproof thermal insulation layer of the battery module with thermal dissipation and thermal runaway prevention in accordance with the present disclosure. The battery module 1 includes: at least one battery 10 and a fireproof thermal insulation layer 20. The at least one battery 10 includes a plurality of battery cells 12. The battery cells 12 are electrically connected through conductors 30. The fireproof thermal insulation layer 20 includes a plurality of battery holes 22 and a plurality of air holes 24 (26) vertically penetrating the fireproof thermal insulation layer 20. The battery holes 22 are used for disposing the battery cells 12 therein, and a side 122 of each battery cell 12 is sleeved in the fireproof thermal insulation layer 20. The air holes 24 (26) are located between adjacent ones of the battery holes 22. The heat transfer coefficient K of the fireproof thermal insulation layer 20 decreases with an increase of the fireproof thermal insulation layer 20.

In an embodiment, a plurality of adjacent battery cells 12 are connected in parallel through a conductor 30 to form at least one sub-battery 14. In another embodiment, the battery module 1 comprises a plurality of sub-batteries 14. Adjacent sub-batteries 14 are connected to one another in series through a conductor 30 to form the battery 10. In an embodiment, the positive and negative terminals of adjacent sub-batteries 14 are transposed on the same plane, as shown in FIG. 1, the battery cells 12 in the rightmost sub-battery 14 are all arranged with their positive terminals 124 facing upwards, while the battery cells 12 in the adjacent sub-batteries 14 all are all arranged with their negative terminals 126 facing upwards. This facilitates the connection of the conductors 30 and also heat dissipation during thermal runaway (which will be explained later).

In an embodiment, as shown in FIG. 2, the air holes 24 and the battery holes 22 are arranged in the tightest configuration in a honeycomb layout. In another embodiment, as shown in FIG. 2, the air holes 26 and the battery holes 22 are arranged in a linear fashion. In other embodiments, the air holes 24 arranged in the tight honeycomb configuration and the air holes 26 arranged in the linear configuration can exist alone or simultaneously in the fireproof thermal insulation layer 20. The air holes 24 and 26 allow air to be expelled from the battery cells 12 to ensure good circulation and heat dissipation of the battery 10.

In an embodiment, in order to ensure safety of the battery module 1 by preventing a complete burnt down of the battery module 1 and the loss of lives and assets, the thermal diffusion of thermal runaway is controlled under the maximum thermal dissipation ability using the concept of a forest fireline. The use of fireproof materials creates a thermal barrier effect and an anisotropic heat transfer characteristic in which heat transfer is slowed in the undesirable direction, while increased in a heat dissipating direction. In an embodiment, the fireproof thermal insulation layer 20 is made of a special material, wherein the heat transfer coefficient K of the fireproof thermal insulation layer 20 varies with different temperature conditions. In another embodiment, the heat transfer coefficient K of the fireproof thermal insulation layer 20 reduces as the temperature of the fireproof thermal insulation layer 20 rises. In yet another embodiment, when the temperature of the fireproof thermal insulation layer 20 is less than a first temperature, the heat transfer coefficient K of the fireproof thermal insulation layer 20 is greater than 0.5 W/m·K; when the temperature of the fireproof thermal insulation layer 20 is between the first temperature and a second temperature, the physical property of the fireproof thermal insulation layer 20 changes with the temperature; and when the temperature of the fireproof thermal insulation layer 20 is greater than a second temperature, the heat transfer coefficient K of the fireproof thermal insulation layer 20 is less than 0.5 W/m·K. It is noted that the first temperature is smaller than the second temperature. In an embodiment, the first temperature is about 60° C., and the second temperature is about 150° C. In other words, when the temperature of the fireproof thermal insulation layer 20 is less than 60° C., the heat transfer coefficient K of the fireproof thermal insulation layer 20 is greater than 0.5 W/m·K, and the fireproof thermal insulation layer 20 has good heat transfer coefficient. When the temperature of the fireproof thermal insulation layer 20 is between 60 and 150° C., the physical property of the fireproof thermal insulation layer 20 changes with the temperature, and the heat transfer coefficient K decreases. When the temperature of the fireproof thermal insulation layer 20 is greater than 150° C., the heat transfer coefficient K of the fireproof thermal insulation layer 20 is less than 0.5 W/m·K, and, this time, the fireproof thermal insulation layer 20 has good thermal resistance. As a result, the fireproof thermal insulation layer 20 can have a good heat transfer coefficient or good thermal resistance. The fireproof thermal insulation layer 20 can be made of a body using a thermal resistive polymer material with a thermal conductive material added to the body. In an embodiment, the polymer material can be a polymer with thermoplastic and thermosetting properties, for example, one selected from polyethylene (PE), polypropylene (PP), polyurethane (PU), epoxy or a combination thereof. The additive can be an inorganic powder having a reactive functional group, such as an aqueous or non-aqueous material of aluminum hydroxide ($Al(OH)_3$) or silicon oxide ($SiO_2$) or the like. In an embodiment, the fireproof thermal insulation layer 20 can be made of a composite of polymer and an inorganic powder having a reactive functional group, such as polyurethane and aluminum hydroxide composite, which also possess the property of a heat transfer coefficient K that varies with different temperature conditions. In another embodiment, the fireproof thermal insulation layer 20 can also be made of a Bulk Molding Compound (BMC) including a composite of glass fiber, inorganic fillers and an unsaturated resin.

Figure 3:
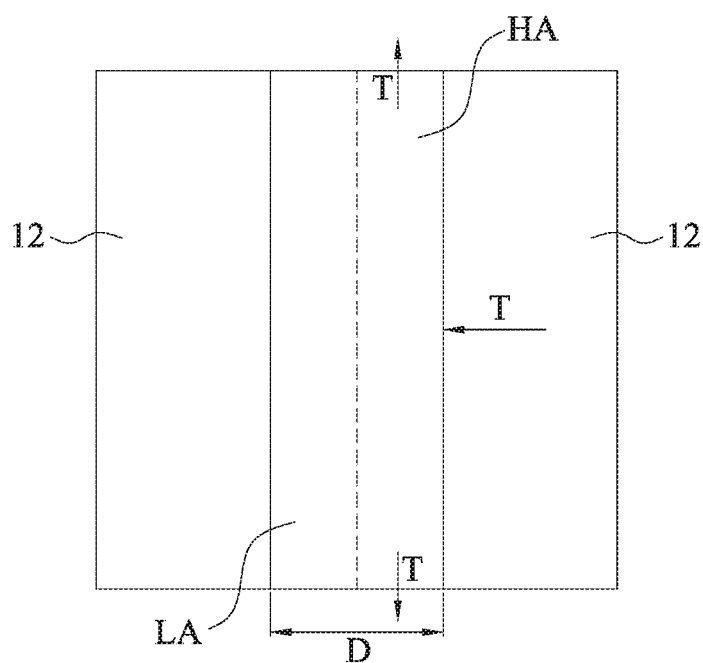
FIG. 3 is a schematic diagram illustrating heat transfer during thermal runaway of a battery cell in the battery module with thermal dissipation and thermal runaway prevention in accordance with the present disclosure.

Refer to FIGS. 1-3. FIG. 3 shows a schematic diagram depicting heat transfer during thermal runaway of battery cells in the battery module with thermal dissipation and thermal runaway prevention in accordance with the present disclosure. A battery cell 12 on the right-hand side of FIG. 3 is a damaged battery cell 12, whereas a battery cell 12 on the left-hand side is a normal battery cell 12. When the battery module 1 is under a normal operating temperature (in low or room temperature), temperature equalization ability of the battery module 1 is not affected by the fireproof thermal insulation layer 20. However, when a battery cell 12 encounters thermal runaway, the damaged battery cell 12 (e.g., the battery cell 12 on the right-hand side of FIG. 3) will create a heat source. The thermal energy T is conducted to the fireproof thermal insulation layer 20 in contact with the side 122 of the damaged battery cell 12, thereby creating a high-temperature zone HA in the fireproof thermal insulation layer 20. In an embodiment, a low-temperature zone LA is formed at a side of the fireproof thermal insulation layer 20 interposed between the damaged battery cell 12 and the normal battery cell 12 (e.g., the battery cell 12 on the left-hand side of FIG. 3) in proximity to the normal battery cell 12. In an embodiment, the temperature of the high-temperature zone HA keeps rising as the fireproof thermal insulation layer 20 is being heated, but the heat transfer coefficient K of the fireproof thermal insulation layer 20 decreases as a result of chemical changes due to changes in temperature. The thermal resistance thus increases and the spreading of the thermal energy T is impeded. As the heat transfer coefficient K of the fireproof thermal insulation layer 20 in the low-temperature zone LA is higher than the heat transfer coefficient K of the fireproof thermal insulation layer 20 in the high-temperature zone HA, in particular, the heat transfer coefficient K of the fireproof thermal insulation layer 20 progressively increases along the thickness D of the fireproof thermal insulation layer 20 towards the end of the normal battery cell 12. Thus, when the thermal energy T of the damaged battery cell 12 is being conducted from the high-temperature zone HA to the low-temperature zone LA, the thermal energy T will be transferred towards the positive terminal 124 and negative terminal 126 of the battery cell 12, thereby preventing combustion and achieving thermal resistance. Meanwhile, hot air can also escape through the air holes 24 (26) in the fireproof thermal insulation layer 20 in the directions towards the positive terminal 124 and negative terminal 126 of the battery cell 12, thereby achieving good heat dissipation and circulation. Therefore, the battery module 1 can effectively slow down the spreading of heat, such that there will be more time for heat to dissipate, preventing overheating and a complete destruction of the battery module 1.

Figure 4:
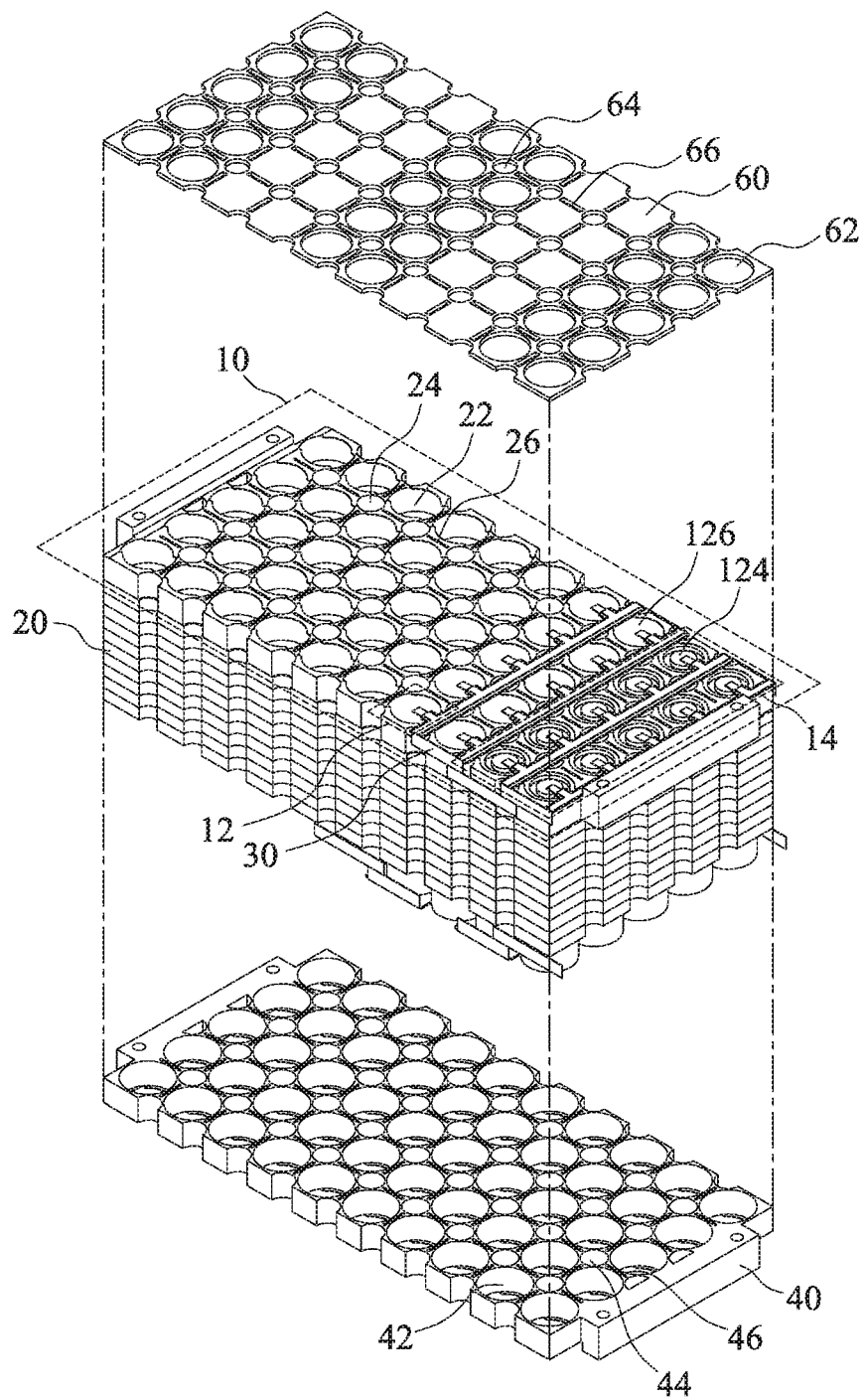
FIG. 4 is an exploded view depicting a battery module with thermal dissipation and thermal runaway prevention in accordance with an embodiment of the present disclosure.
Figure 5:
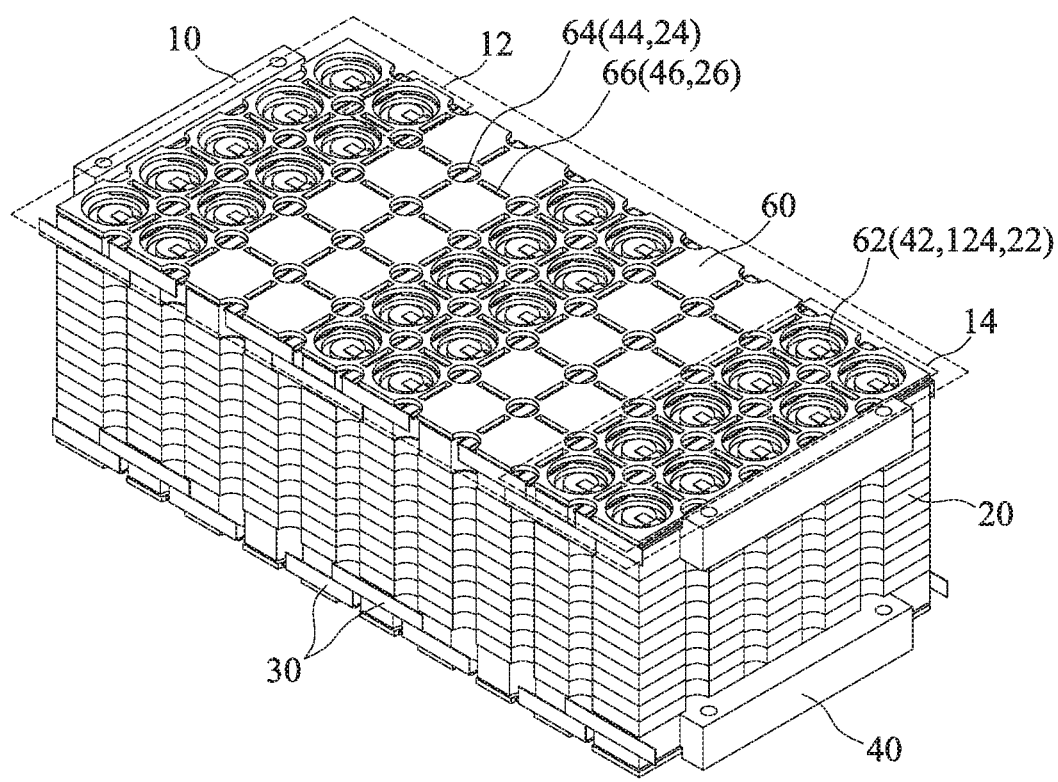
FIG. 5 is a schematic diagram depicting the battery module with thermal dissipation and thermal runaway prevention in accordance with an embodiment of the present disclosure.

FIG. 4 shows an exploded view depicting the battery module with thermal dissipation and thermal runaway prevention in accordance with an embodiment of the present disclosure. FIG. 5 shows a schematic diagram depicting the battery module with thermal dissipation and thermal runaway prevention in accordance with an embodiment of the present disclosure. It should be noted that, in FIG. 4, in order to better present the configuration of various elements, only a portion of the battery cell 12 (a sub-battery 14) of the battery 10 is shown. In an embodiment, the battery module 1 further includes at least one supporting base 40 disposed adjacent to the fireproof thermal insulation layer 20. The supporting base 40 includes a plurality of battery positioning holes 42 and a plurality of through holes 44 (46) vertically penetrating the supporting base 40. The battery positioning holes 42 are aligned with the battery holes 22, and the through holes 44 (46) are aligned with the air holes 24 (26) respectively, such that the sides 122 of the battery cells 12 are received in the supporting base 40. In the embodiments of FIGS. 4 and 5, there are two supporting bases 40 on two opposite sides of the battery cells 12, respectively. In an embodiment, the supporting bases 40 are disposed on the positive terminal end and the negative terminal end of the battery cells 12. The battery positioning holes 42 of the supporting base 40 can hold the battery cells 12 in place, and the through holes 44 (46) continue the path of the air holes 24 (26) for venting hot air and exhaust. Therefore, the supporting base 40 can also be made of a material having the same characteristic as the fireproof thermal insulation layer 20 to further enhance thermal dissipation and thermal runaway prevention.

Figure 6:
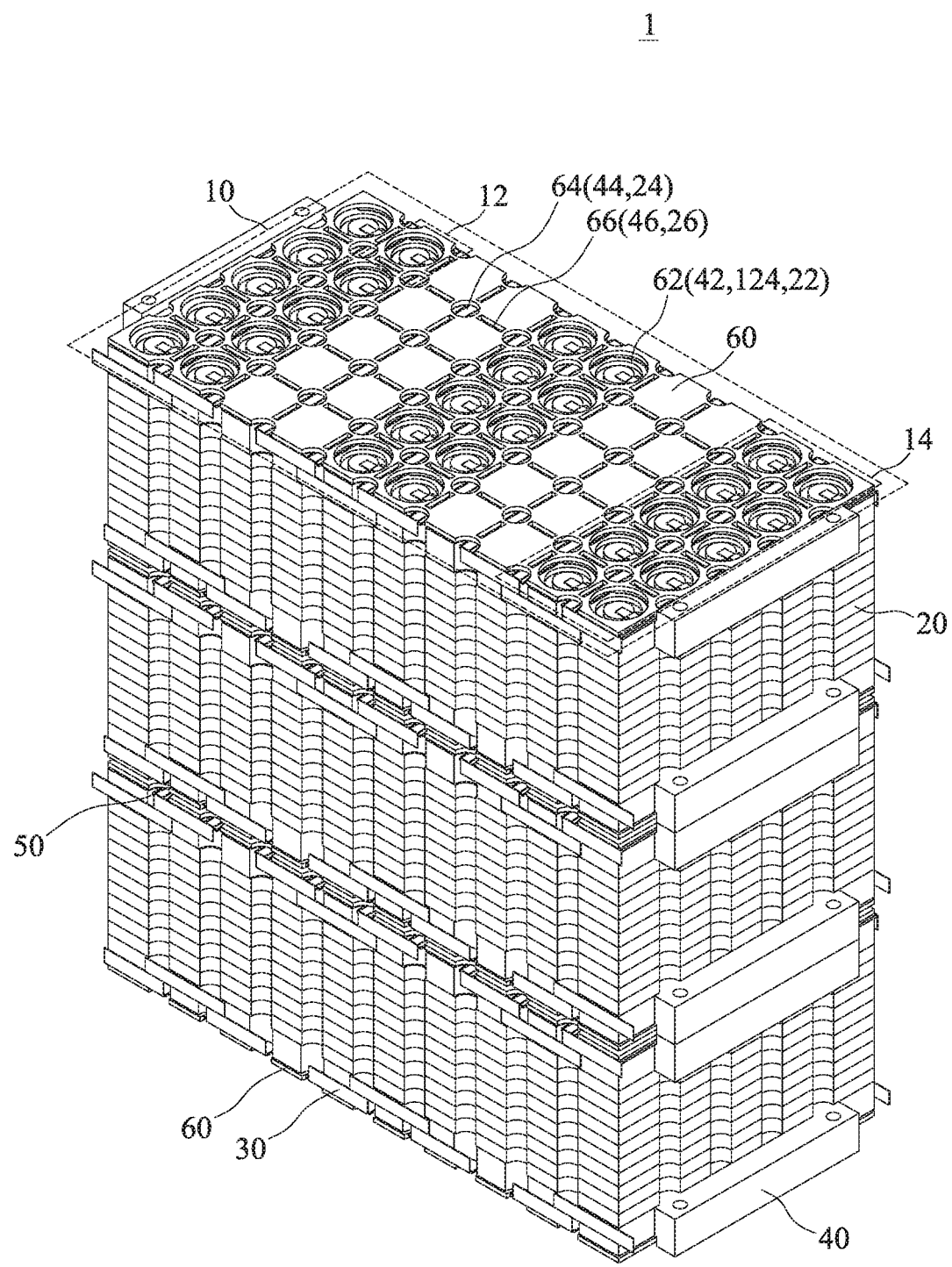
FIG. 6 is a schematic diagram depicting the battery module with thermal dissipation and thermal runaway prevention in accordance with an embodiment of the present disclosure.

Referring to FIG. 6, a schematic diagram depicting the battery module with thermal dissipation and thermal runaway prevention in accordance with another embodiment of the present disclosure is shown. In an embodiment, there are several batteries 10 stacked on one another in that the supporting bases 40 belonging to different batteries 10 are stacked on top of each other to form gaps 50 between two adjacent supporting bases 40. The formation of these gaps 50 also facilitates the expelling of air. When passing through the air holes 24 (26) and reaching the through holes 44 (46), the hot air and exhaust can be further vented out through the gaps 50 formed between the adjacent supporting bases 40, preventing hot air and exhaust from being trapped inside the batteries 10 that would result in an increase in temperature of the battery module 1.

In the embodiments of FIGS. 4 and 5, the battery module 1 further includes at least one cover plate 60 disposed adjacent to the supporting base 40 with a plurality of electrode through holes 62 and a plurality of through holes 64 (66) vertically penetrating the cover plate 60. Each of the electrode through holes 62 is aligned with one of the positive terminal 124 and the negative terminal 126 of a battery cell 12, and the through holes 64 (66) are aligned with the air holes 24 (26) and the through holes 44 (46) respectively. In an embodiment shown in FIG. 6, there are two cover plate 60 in each battery 10 disposed at two opposite sides of the battery cell 12. In an embodiment, the cover plates 60 are disposed on the positive terminal end and the negative terminal end of the battery cell 12. In other embodiments, when the battery module 1 includes no supporting bases 40, the cover plate 60 is provided adjacent the fireproof thermal insulation layer 20, and each of the electrode through holes 62 is aligned with one of the positive terminal 124 and the negative terminal 126 of a battery cell 12, and the through holes 64 (66) are aligned with the air holes 24 (26) respectively.

In the embodiments of FIGS. 4 to 6, the electrode through holes 62 are aligned with the positive terminals 124 of the battery cell 12 as an example. However, the present disclosure is not limited as such. In these embodiments, the cover plate 60 at locations corresponding to the positive terminals 124 of the battery cells 12 include the electrode through holes 62, whereas at locations corresponding to the negative terminals 126 of the battery cells 12 have closed ends. It also cooperates that the arrangement relationship of the positive and negative terminals of adjacent sub-batteries 14 are transposed on the same plane, when a plurality of batteries 10 are stacked on one another as shown in FIG. 6, locations of the negative terminals 126 of an upper battery 10 will correspond to locations of the positive terminals 124 in a lower battery 10. When thermal runaway of a battery cell 12 and thus depressurization occur, the arrangements of the cover plates 60 guides the depressurized gas flowed primarily in a single direction, and prevents the stacked battery cells 12 from direct impact. Therefore, the cover plate 60 can also be made of a material having the same characteristic as the fireproof thermal insulation layer 20 to further enhance thermal dissipation and thermal runaway prevention.

Figure 7:
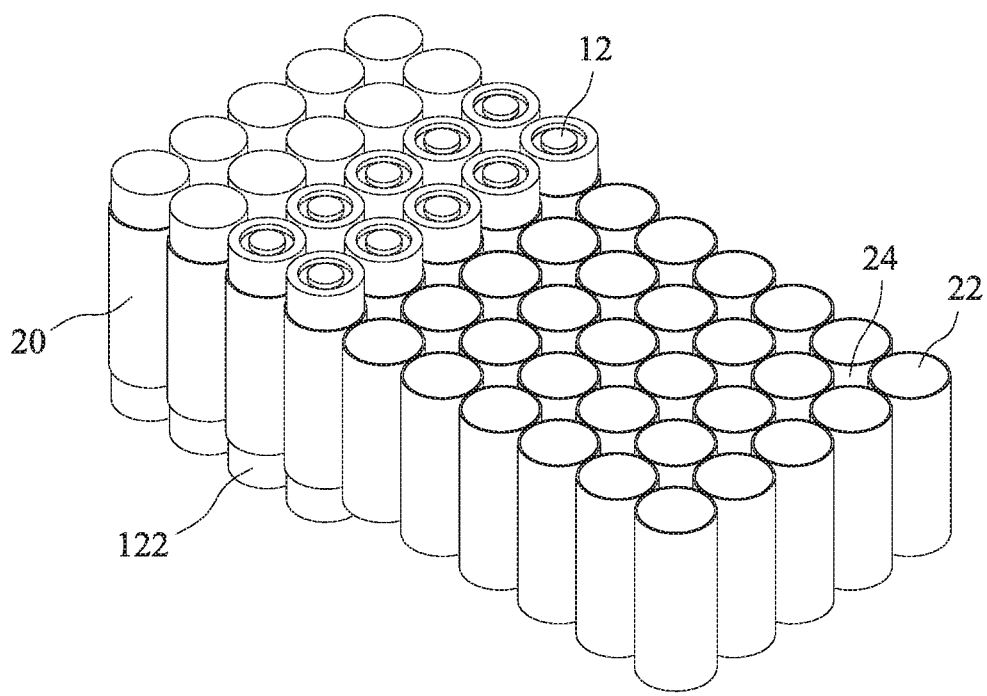
FIG. 7 is a schematic diagram depicting the arrangement of battery cells and a fireproof thermal insulation layer of a battery module with thermal dissipation and thermal runaway prevention in accordance with an embodiment of the present disclosure.

In the embodiment of FIG. 1, there are a plurality of fireproof thermal insulation layers 20 stacked on one another, but they do not cover the entire sides 122 of the respective battery cells 12. However, in other embodiments, such as those shown in FIGS. 4 to 6, the fireproof thermal insulation layer 20 are stacked on one another, such that the sides 122 of the battery cells 12 are completed covered by the fireproof thermal insulation layer 20. In other embodiments, the height of the fireproof thermal insulation layer 20 can be made to be substantially the same as the height of the battery cell 12. In this case, only a single fireproof thermal insulation layer 20 is required to completely enclose the sides 122 of the battery cells 12 within the fireproof thermal insulation layer 20. Moreover, the shape of the fireproof thermal insulation layer 20 is not limited to a particular one, in the embodiment of FIG. 2, adjacent battery holes 22 are arranged in a tight honeycomb fashion in the fireproof thermal insulation layer 20, the adjacent battery holes 22 have fireproof thermal insulation layer 20 of different thicknesses in different directions, thereby forming a honeycomb-shaped fireproof thermal insulation layer 20. However, in another embodiment, such as that shown in FIG. 7, adjacent battery holes 22 are arranged in a linear fashion in the fireproof thermal insulation layer 20, the adjacent battery holes 22 have fireproof thermal insulation layer 20 of the same thickness in different directions, thereby forming a multi-tubular fireproof thermal insulation layer 20.

In the battery module with thermal dissipation and thermal runaway prevention according to the present disclosure, with the configurations of the batteries and the fireproof thermal insulation layers in conjunction with the fireproof thermal insulation layer 20 made of a material having a heat transfer coefficient that varies with a change in temperature, the battery module improves safety of the batteries by maintaining good circulation and heat dissipation while preventing combustion and heat transfer to adjacent cells.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A battery module with thermal dissipation and thermal runaway prevention, comprising:
    at least one battery including a plurality of battery cells electrically connected to one another through a conductor; and
    a fireproof thermal insulation layer including a plurality of battery holes for disposing the battery cells therein and a plurality of air holes vertically penetrating the fireproof thermal insulation layer, wherein a side of each of the battery cells is sleeved in the fireproof thermal insulation layer, and the plurality of air holes are provided between adjacent ones of the plurality of battery holes,
    wherein a heat transfer coefficient of the fireproof thermal insulation layer decreases as a temperature of the fireproof thermal insulation layer increases, and
    wherein a part of the side of each of the battery cells is enclosed within the fireproof thermal insulation layer.

2. The battery module with thermal dissipation and thermal runaway prevention of claim 1, wherein the adjacent ones of the battery cells are connected in parallel through the conductor to form at least one sub-battery.

3. The battery module with thermal dissipation and thermal runaway prevention of claim 2, wherein the at least one sub-battery is plural, and adjacent ones of a plurality of the sub-batteries are connected in series through the conductor to form the battery.

4. The battery module with thermal dissipation and thermal runaway prevention of claim 3, wherein the adjacent ones of the plurality of sub-batteries have positive and negative terminals transposed on a same plane.

5. The battery module with thermal dissipation and thermal runaway prevention of claim 1, wherein the plurality of air holes and the plurality of battery holes are arranged in a honeycomb configuration.

6. The battery module with thermal dissipation and thermal runaway prevention of claim 1, wherein the plurality of air holes and the plurality of battery holes are arranged in a linear configuration.

7. The battery module with thermal dissipation and thermal runaway prevention of claim 1, wherein the heat transfer coefficient is greater than 0.5 W/m·K when the fireproof thermal insulation layer is less than a first temperature, and the heat transfer coefficient is less than 0.5 W/m·K when the fireproof thermal insulation layer is greater than a second temperature, and wherein the first temperature is less than the second temperature.

8. The battery module with thermal dissipation and thermal runaway prevention of claim 7, wherein the first temperature is around 60° C., and the second temperature is around 150° C.

9. The battery module with thermal dissipation and thermal runaway prevention of claim 1, wherein the fireproof thermal insulation layer is made of a composite of a polymer and an inorganic powder having a reactive functional group, or a bulk molding compound (BMC) including a composite of glass fiber, inorganic fillers and an unsaturated resin.

10. The battery module with thermal dissipation and thermal runaway prevention of claim 9, wherein the composite of the polymer and the inorganic powder having the reactive functional group is a composite of polyurethane and aluminum hydroxide.

11. The battery module with thermal dissipation and thermal runaway prevention of claim 1, further comprising at least one supporting base disposed adjacent to the fireproof thermal insulation layer, the at least one supporting base having a plurality of battery positioning holes and a plurality of through holes vertically penetrating the at least one supporting base, wherein the plurality of battery positioning holes are aligned with the plurality of battery holes, the plurality of through holes are aligned with the plurality of air holes, and the side of each of the battery cells is sleeved in the at least one supporting base.

12. The battery module with thermal dissipation and thermal runaway prevention of claim 11, wherein a number of the at least one supporting base is two, and the two supporting bases are disposed on two opposite sides of the battery cells, respectively.

13. The battery module with thermal dissipation and thermal runaway prevention of claim 12, wherein the at least one battery is plural, and a plurality of the batteries are arranged in a stack configuration, and wherein the two supporting bases belonging to different batteries are stacked on top of each other to form gaps between the two supporting bases adjacent to each other.

14. The battery module with thermal dissipation and thermal runaway prevention of claim 13, further comprising at least one cover plate disposed adjacent to the at least one supporting base including a plurality of electrode through holes and a plurality of through holes vertically penetrating the at least one cover plate, wherein each of the plurality of electrode through holes is aligned with a location of one of a positive terminal and a negative terminal of one of the battery cells, and the plurality of through holes of the at least one cover plate are aligned with the plurality of air holes and the plurality of through holes of the supporting base.

15. The battery module with thermal dissipation and thermal runaway prevention of claim 1, further comprising at least one cover plate disposed adjacent to the fireproof thermal insulation layer including a plurality of electrode through holes and a plurality of through holes vertically penetrating the at least one cover plate, wherein each of the plurality of electrode through holes is aligned with a location of one of a positive terminal and a negative terminal of one of the battery cells, and the plurality of through holes of the at least one cover plate are aligned with the plurality of air holes.

16. The battery module with thermal dissipation and thermal runaway prevention of claim 1, wherein the fireproof thermal insulation layer is plural, and a plurality of the fireproof thermal insulation layers are stacked on one another, and wherein a part of the side of each of the battery cells is enclosed within the fireproof thermal insulation layers.

* * * * *